United States Patent
Varerkar et al.

(10) Patent No.: US 12,019,783 B2
(45) Date of Patent: *Jun. 25, 2024

(54) AUTOMATICALLY ENHANCING PRIVACY IN LIVE VIDEO STREAMING

(71) Applicant: Intel Corporation, Santa Clara, CA (US)

(72) Inventors: Mayuresh Varerkar, Folsom, CA (US); Barnan Das, Newark, CA (US); Archie Sharma, Folsom, CA (US); Gokcen Cilingir, San Jose, CA (US); Narayan Biswal, Folsom, CA (US); Melanie Daniels, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 13 days.

This patent is subject to a terminal disclaimer.

(21) Appl. No.: 17/866,305

(22) Filed: Jul. 15, 2022

(65) Prior Publication Data
US 2023/0043920 A1 Feb. 9, 2023

Related U.S. Application Data

(63) Continuation of application No. 16/242,785, filed on Jan. 8, 2019, now Pat. No. 11,392,709.

(51) Int. Cl.
| | | |
|---|---|---|
| G06F 21/62 | (2013.01) | |
| G06F 21/55 | (2013.01) | |
| G06V 10/764 | (2022.01) | |
| G06V 20/20 | (2022.01) | |
| G06V 20/52 | (2022.01) | |

(Continued)

(52) U.S. Cl.
CPC ........ *G06F 21/6245* (2013.01); *G06F 21/554* (2013.01); *G06F 21/62* (2013.01); *G06V 10/764* (2022.01); *G06V 20/20* (2022.01); *G06V 20/52* (2022.01); *G08B 13/19686* (2013.01); *G08B 13/22* (2013.01); *H04L 63/101* (2013.01); *H04N 7/147* (2013.01); *H04N 7/15* (2013.01); *H04N 7/155* (2013.01); *H04W 12/02* (2013.01);

(Continued)

(58) Field of Classification Search
CPC ... G06F 21/62; G06F 21/554; G06K 9/00671; G08B 13/19686; G08B 13/22; H04L 63/101; H04N 7/147; H04N 7/15; H04N 7/155; H04W 12/02
See application file for complete search history.

(56) References Cited

U.S. PATENT DOCUMENTS 6,002,427 A 12/1999 Kipust
9,123,349 B2 9/2015 de la Guardia Gonzales
(Continued)

OTHER PUBLICATIONS

United States Patent and Trademark Office, "Non-Final Office Action," dated Feb. 26, 2021 in connection with U.S. Appl. No. 16/242,785, 13 pages.

(Continued)

*Primary Examiner* — Oleg Korsak
(74) *Attorney, Agent, or Firm* — Hanley, Flight & Zimmerman

(57) ABSTRACT

Disclosed examples include an interface; programmable circuitry; and instructions to cause the programmable circuitry to: detect a person in physical proximity of a client device; and initiate activation of one or more privacy filters at the client device to blur information via a videoconferencing application.

24 Claims, 10 Drawing Sheets

(51) Int. Cl.
| | |
|---|---|
| *G08B 13/196* | (2006.01) |
| *G08B 13/22* | (2006.01) |
| *H04L 9/40* | (2022.01) |
| *H04N 7/14* | (2006.01) |
| *H04N 7/15* | (2006.01) |
| *H04W 12/02* | (2009.01) |
| *G06V 40/16* | (2022.01) |
| *G06V 40/20* | (2022.01) |
| *H04W 12/63* | (2021.01) |

(52) U.S. Cl.
CPC ...... *G06F 2221/032* (2013.01); *G06V 40/172* (2022.01); *G06V 40/25* (2022.01); *H04W 12/63* (2021.01)

(56) References Cited

U.S. PATENT DOCUMENTS

| | | |
|---|---|---|
| 9,557,953 B2 | 1/2017 | Olmo et al. |
| 9,953,467 B2 | 4/2018 | Smith et al. |
| 10,068,101 B2 | 9/2018 | Durham |
| 10,380,375 B2 | 8/2019 | Weast et al. |
| 10,559,202 B2 | 2/2020 | Yang et al. |
| 10,719,744 B2 | 7/2020 | Smith et al. |
| 10,742,399 B2 | 8/2020 | Chen et al. |
| 11,392,709 B2 * | 7/2022 | Varerkar ............ G06F 21/62 |
| 2009/0273562 A1 | 11/2009 | Baliga et al. |
| 2010/0205667 A1 * | 8/2010 | Anderson ............ G06F 3/017 726/19 |
| 2014/0283100 A1 * | 9/2014 | Harrison ............ G06F 21/6245 726/26 |
| 2016/0148015 A1 | 5/2016 | Weast et al. |
| 2018/0300556 A1 | 10/2018 | Varerkar et al. |
| 2019/0147175 A1 | 5/2019 | Varerkar et al. |
| 2020/0081527 A1 | 3/2020 | Agaoglu et al. |

OTHER PUBLICATIONS

United States Patent and Trademark Office, "Final Office Action," dated Jun. 14, 2021 in connection with U.S. Appl. No. 16/242,785, 17 pages.

United States Patent and Trademark Office, "Advisory Action," dated Sep. 21, 2021 in connection with U.S. Appl. No. 16/242,785, 3 pages.

United States Patent and Trademark Office, "Non-Final Office Action," dated Nov. 10, 2021 in connection with U.S. Appl. No. 16/242,785, 5 pages.

United States Patent and Trademark Office, "Notice of Allowance and Fee(s) Due," dated Mar. 21, 2022 in connection with U.S. Appl. No. 16/242,785, 7 pages.

Khan et al., "Wearable Sensor-Based Location-Specific Occupancy Detection in Smart Environments," Hindawi Mobile Information Systems, vol. 2018, Article ID 4570182, Apr. 1, 2018, 22 pages.

Honeywell "Megapixel Series Vari-focal Lenses," Jul. 2011, 2 pages.

* cited by examiner

|  | Person B (Local User) - Private | Person B (Local User) - Public |
|---|---|---|
| Person A (Remote User) - Private | Privacy for Person B:<br>• Deactivate camera and display message to remote user to inform remote user about intruder.<br>• Blur camera feed sent to remote user to indicate presence of intruder.<br>• Deactivate microphone.<br>• Deactivate open application windows.<br>• Deactivate display.<br>• Deactivate speakers.<br>Privacy for Person A:<br>• Deactivate application window that reveals identity of Person A.<br>• Deactivate speakers. | Privacy for Person B:<br>• Nothing.<br>Privacy for Person A:<br>• Deactivate application window that reveals identity of Person A.<br>• Deactivate speakers. |
| Person A (Remote User) - Public | Privacy for Person B:<br>• Deactivate camera and display message to remote user to inform remote user about intruder.<br>• Blur camera feed sent to remote user to indicate presence of intruder.<br>• Deactivate microphone.<br>• Deactivate open application windows.<br>• Deactivate display.<br>• Deactivate speakers.<br>Privacy for Person A:<br>• Nothing. | Privacy for Person B:<br>• Nothing.<br>Privacy for Person A:<br>• Nothing. |

FIG. 2

AUTOMATICALLY ENHANCING PRIVACY IN LIVE VIDEO STREAMING

RELATED APPLICATION

This patent arises from a continuation of U.S. patent application Ser. No. 16/242,785, filed Jan. 8, 2019, now U.S. Pat. No. 11,392,709, entitled "AUTOMATICALLY ENHANCING PRIVACY IN LIVE VIDEO STREAMING," which is incorporated herein by reference in its entirety.

BACKGROUND

Live video streaming applications such as video conferencing, online game broadcasting, and video blogging can use data-level encryption to protect video and audio data and provide privacy at the data level. At the network level, privacy can be attained by preventing attackers from tapping into the video and audio streams. In a business office setting, privacy is important to maintain in order to protect the confidentiality of a company's information.

However, privacy at the data level and the network level might not be adequate to prevent unauthorized communication of confidential information. For example, the in-person presence of an intruder in the physical spaces of a user conducting a live video stream application can disclose confidential information to the intruder. Live video streaming is not equipped to handle these kinds of situations.

BRIEF DESCRIPTION OF THE DRAWINGS

Features and advantages of technology embodiments will be apparent from the detailed description which follows, taken in conjunction with the accompanying drawings, which together illustrate, by way of example, various technology features; and, wherein:

FIG. 2 illustrates a table depicting secured user access between a local user and remote user in accordance with an example embodiment;

Figure 1A:
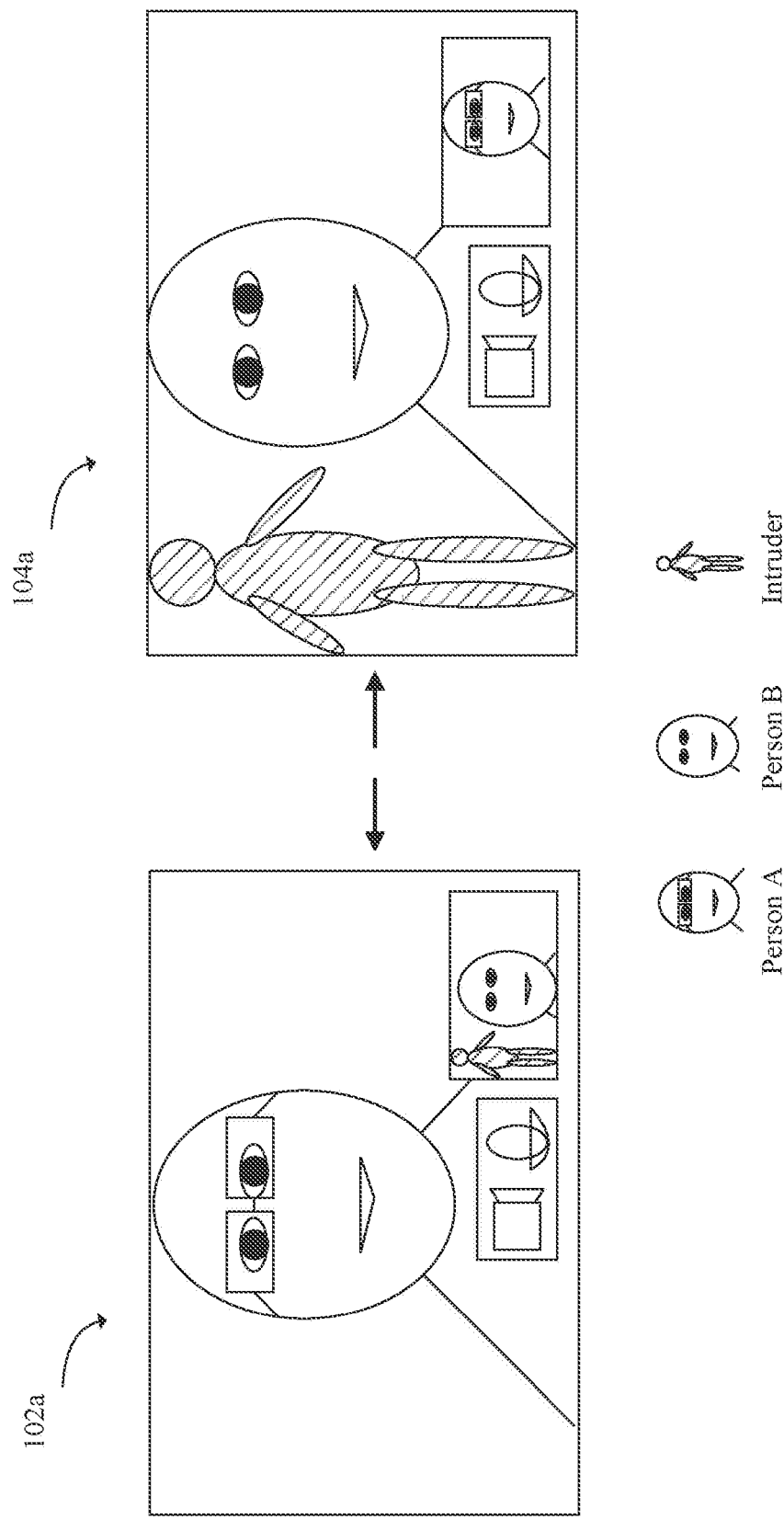
FIG. 1a illustrates a system for live video streaming in accordance with an example embodiment.

Reference will now be made to the exemplary embodiments illustrated, and specific language will be used herein to describe the same. It will nevertheless be understood that no limitation on technology scope is thereby intended.

DESCRIPTION OF EMBODIMENTS

Before the disclosed technology embodiments are described, it is to be understood that this disclosure is not limited to the particular structures, process steps, or materials disclosed herein, but is extended to equivalents thereof as would be recognized by those ordinarily skilled in the relevant arts. It should also be understood that terminology employed herein is used for the purpose of describing particular examples or embodiments only and is not intended to be limiting. The same reference numerals in different drawings represent the same element. Numbers provided in flow charts and processes are provided for clarity in illustrating steps and operations and do not necessarily indicate a particular order or sequence.

Furthermore, the described features, structures, or characteristics can be combined in any suitable manner in one or more embodiments. In the following description, numerous specific details are provided, such as examples of layouts, distances, network examples, etc., to provide a thorough understanding of various invention embodiments. One skilled in the relevant art will recognize, however, that such detailed embodiments do not limit the overall technological concepts articulated herein, but are merely representative thereof.

As used in this written description, the singular forms "a," "an" and "the" include express support for plural referents unless the context clearly dictates otherwise. Thus, for example, reference to "a sensor" includes a plurality of such sensors.

Reference throughout this specification to "an example" means that a particular feature, structure, or characteristic described in connection with the example is included in at least one embodiment of the present invention. Thus, appearances of the phrases "in an example" or "an embodiment" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present technology can be referred to herein along with alternatives for the various components thereof. It is understood that such embodiments, examples, and alternatives are not to be construed as defacto equivalents of one another, but are to be considered as separate and autonomous representations under the present disclosure.

Furthermore, the described features, structures, or characteristics can be combined in any suitable manner in one or more embodiments. In the following description, numerous specific details are provided, such as examples of layouts, distances, network examples, etc., to provide a thorough understanding of invention embodiments. One skilled in the relevant art will recognize, however, that the technology can be practiced without one or more of the specific details, or with other methods, components, layouts, etc. In other instances, well-known structures, materials, or operations may not be shown or described in detail to avoid obscuring aspects of the disclosure.

In this disclosure, "comprises," "comprising," "containing" and "having" and the like can have the meaning ascribed to them in U.S. patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. patent law. "Consisting essentially of" or "consists essentially of" have the meaning generally ascribed to them by U.S. patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the compositions nature or characteristics would be permissible if present under the "consisting essentially of" language, even though not expressly recited in a list of items following such terminology. When using an open ended term in this written description, like "comprising" or "including," it is understood that direct support should be afforded also to "consisting essentially of" language as well as "consisting of" language as if stated explicitly and vice versa.

The terms "first," "second," "third," "fourth," and the like in the description and in the claims, if any, are used for distinguishing between similar elements and not necessarily for describing a particular sequential or chronological order. It is to be understood that any terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

As used herein, comparative terms such as "increased," "decreased," "better," "worse," "higher," "lower," "enhanced," "maximized," "minimized," and the like refer to a property of a device, component, or activity that is measurably different from other devices, components, or activities in a surrounding or adjacent area, in a single device or in multiple comparable devices, in a group or class, in multiple groups or classes, or as compared to the known state of the art. For example, a sensor with "increased" sensitivity can refer to a sensor in a sensor array which has a lower level or threshold of detection than one or more other sensors in the array. A number of factors can cause such increased sensitivity, including materials, configurations, architecture, connections, etc.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "about" is used to provide flexibility to a numerical range endpoint by providing that a given value may be "a little above" or "a little below" the endpoint. However, it is to be understood that even when the term "about" is used in the present specification in connection with a specific numerical value, that support for the exact numerical value recited apart from the "about" terminology is also provided.

Numerical amounts and data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 1.5, 2, 2.3, 3, 3.8, 4, 4.6, 5, and 5.1 individually.

This same principle applies to ranges reciting only one numerical value as a minimum or a maximum. Furthermore, such an interpretation should apply regardless of the breadth of the range or the characteristics being described.

An initial overview of technology embodiments is provided below and then specific technology embodiments are described in further detail later. This initial summary is intended to aid readers in understanding the technology more quickly, but is not intended to identify key or essential technological features nor is it intended to limit the scope of the claimed subject matter. Unless defined otherwise, all technical and scientific terms used herein have the same meaning as commonly understood by one of ordinary skill in the art to which this disclosure belongs.

In a business office setting, privacy is important to maintain in order to protect the confidentiality of a company's information. However, privacy at the data level and the network level might not be adequate to prevent unauthorized communication of confidential information. For example, the in-person presence of an intruder in the physical spaces of a user conducting a live video stream application can disclose confidential information to the intruder.

In one example, during two-party or multi-party video conferencing, the in-person presence of an intruder in the physical spaces of a user participating in the video conference can disclose valuable information to the intruder. In order to prevent the disclosure of the valuable information and preserve privacy, the user might attempt to manually turn off the camera, mute the microphone and speaker, or minimize the application window when the user has detected that an intruder has entered the vicinity of the user.

This potential solution to the in-person presence of an intruder presents a few problems. First, the user may not be able to detect the in-person presence of the intruder until disclosure of valuable information has already occurred. Second, the user might find it difficult to manually turn off the camera, mute the microphone and speaker, and minimize the application window every time that the user detects the in-person presence of an intruder.

In one example, a device (i.e. a device used by a user, such as a desktop computer or work station, or a mobile device, such as a laptop computer, a tablet computer, or a smart phone, or other audio and/or video device) can be operable for secured user access. The device (e.g. a local device) can comprise one or more processors. The one or more processors can be configured to identify an intruder indicator, wherein the intruder indicator indicates that an intruder has been detected in a proximity of either the local device or a remote device in communication with the local device. The one or more processors can be further configured to activate one or more privacy filters at the local device. The one or more processors can be further configured to encode data based on the one or more privacy filters. In this example, the device can detect the in-person presence of the intruder before the disclosure of valuable information has occurred. In addition, automatic activation of the privacy filters at the local device can ameliorate the difficulty of manually turning off the camera, muting the microphone and speaker, and minimizing the application window every time that the user detects the in-person presence of an intruder.

In one example, as illustrated in FIG. 1a, live video conferencing can occur between Person A and Person B. Person A can view the display 104a and Person B can view the display 102a. During live video conferencing between Person A and Person B, an Intruder, can enter the physical proximity of Person B. When Person B detects the Intruder, Person B can attempt to manually turn off the camera, mute the microphone, mute the speakers, and minimize any open application windows. By manually turning off the camera, Person B can attempt to prevent Person A from receiving information about the Intruder. By manually muting the microphone, Person B can attempt to prevent Person A from hearing any conversation between Person B and the Intruder. By muting the speakers, Person B can attempt to prevent the Intruder from hearing the conversation between Person B and Person A. By minimizing any open application windows, Person B can attempt to prevent the Intruder from receiving information about Person A and the shared content between Person B and Person A.

However, as previously discussed, Person B may not be able to manually turn off the camera, mute the microphone, mute the speakers, and minimize any open application windows before valuable information has spread to Person A or to the Intruder if Person B is not be able to detect the presence of the Intruder in a timely manner. Also, manually turning off the camera, muting the microphone, muting the speakers, and minimizing any open application windows can be burdensome on Person B, especially in the case of frequent intrusions. In addition, Person B might not be able to detect the presence of the Intruder unless Person B can see or hear the Intruder.

Figure 1B:
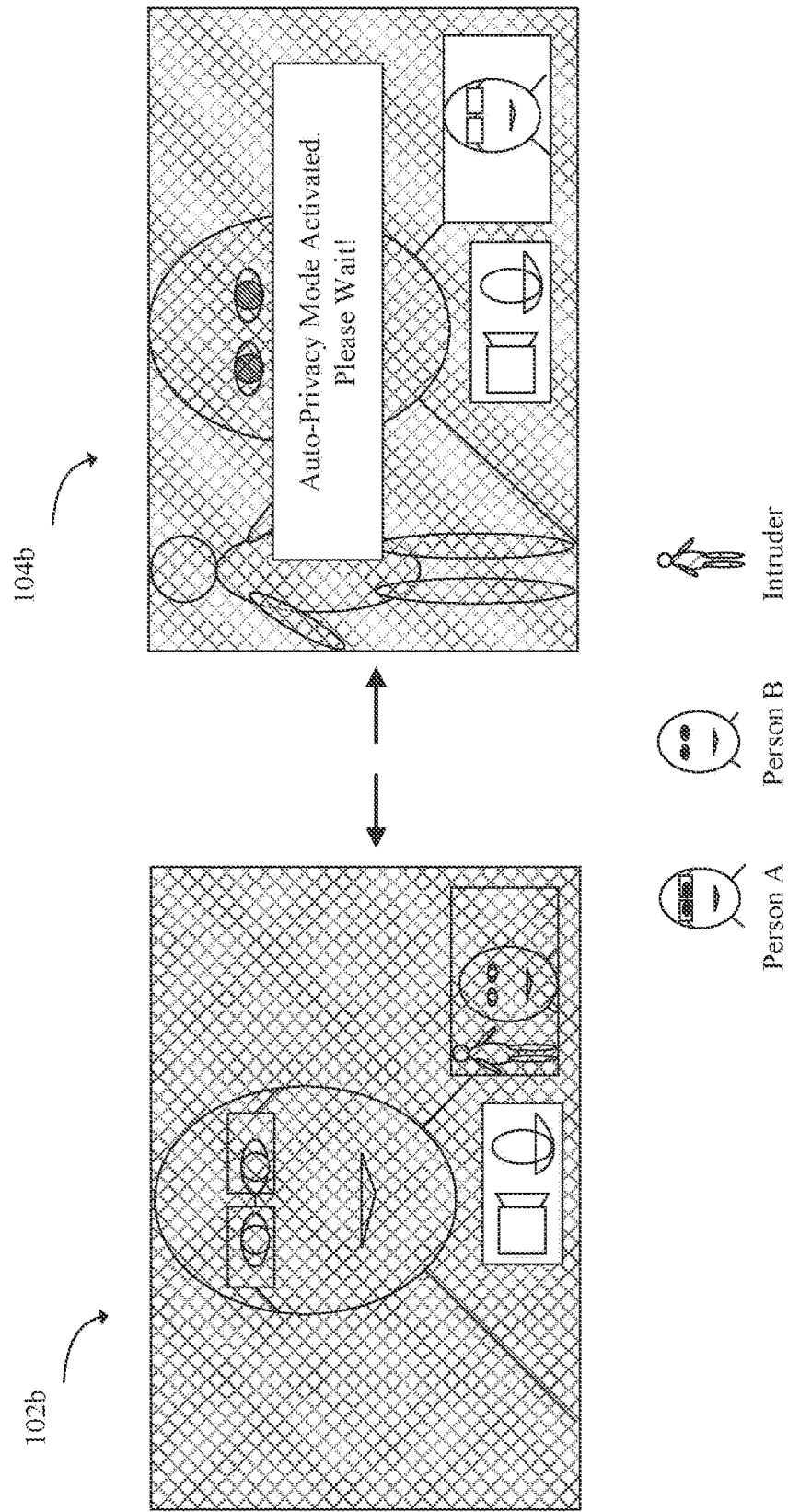
FIG. 1b illustrates a system for live video streaming with secured user access in accordance with an example embodiment.

In one example, as illustrated in FIG. 1b, live video conferencing can occur between Person A and Person B. Person A can view the display 104b and Person B can view the display 102b. During live video conferencing between Person A and Person B, an Intruder, can enter the physical proximity of Person B. In this example, the device used by Person B for live video conferencing with Person A (i.e. Person B's device) can be configured to detect the Intruder in the proximity of Person B's device. Person B's device can be configured to identify an intruder indicator, wherein the intruder indicator indicates that an intruder has been detected in a proximity of Person B's device. Person B's device can be configured to activate one or more privacy filters at Person B's device. Person B's device can be configured to encode data based on the one or more privacy filters.

The example illustrated in FIG. 1b is not intended to be limiting. Other applications can include: live video conferencing among more than two people, live or recorded video blogging, online gaming, or any other application in which audio information or video information is received by one or more people or transmitted by one or more people to another person or people.

In one example, a device (e.g. a local device) can receive a recorded video or audio. In an example, the local device can receive a recorded educational lecture online in which the lecture can include audio or video content. In this example, the local device can be configured to identify an intruder indicator, wherein the intruder indicator indicates that an intruder has been detected in a proximity of the local device. The local device can be further configured to activate one or more privacy filters at the local device. The local device can be further configured to encode data based on the one or more privacy filters. The local device can receive the recorded educational lecture from a website, a personal area network, a local area network, or any other wireless or wired connection.

In one example, the device (e.g. a local device) can be configured in cases in which a local user is viewing sensitive or confidential documents to restrict intruders from viewing the sensitive or confidential documents. In this example, the local device can be configured to identify an intruder indicator, wherein the intruder indicator indicates that an intruder has been detected in proximity of the local device; activate one or more privacy filters at the local device; and encode data based on the one or more privacy filters.

In one example, a remote device (i.e. Person A's device) can be configured to receive video or audio information from a local device (i.e. Person B's device). In this example, the remote device can be configured to identify an intruder indicator, wherein the intruder indicator indicates that an intruder has been detected in proximity of the local device; activate one or more privacy filters at the remote device; and encode data based on the one or more privacy filters. The remote device can receive an intruder indicator from the local device or the remote device can be configured to detect an intruder at the local device based on the video or audio information received from the local device.

In one example, Person B's device can be configured to identify a number of authorized users in a proximity of either Person B's device or Person A's device. In an example, if Person B is the only authorized user, then the number of authorized users would be equal to 1. If Person B and two other people were authorized users, then the number of authorized users would be equal to 3. In one example, Person's B's device can be configured to identify a number of users in a proximity of Person B's device. In an example, the number of users can be equal to 2 if Person B is using Person B's device and an intruder is also present in the proximity of Person B's device.

In one example, Person B's device can be configured to activate the intruder indicator when the number of users in the proximity of either Person B's device or Person A's device is greater than the number of authorized users in the proximity of either Person B's device or Person A's device, e.g. when only Person B is an authorized user and another person, an intruder, is in the proximity of Person B's device. The intruder indicator can be activated by setting the value of the intruder indicator to "true."

In one example, Person B's device can be configured to deactivate the intruder indicator when the number of users in the proximity of either Person B's device or Person A's device is less than or equal to the number of authorized users in the proximity of either Person B's device or Person A's device, e.g. when only Person B is an authorized user and no other person is in the proximity of Person B's device. The intruder indicator can be deactivated by setting the value of the intruder indicator to "false."

In one example, a list of authorized users can be modified by adding a user to the list of authorized users or deleting a user from the list of authorized users. In an example, the list of authorized users can include only Person B. The list of authorized users can be modified by adding Person C and Person D so that the list of authorized users includes Person B, Person C, and Person D. The list of authorized users can be further modified by deleting Person C so that the list of authorized users includes Person B and Person D.

In one example, Person B's device can be configured to activate the intruder indicator when a user is recognized in the proximity of the local device (i.e. Person B's device) who is not an authorized user. In an example, when the list of authorized users includes only Person B and Person D, and Person C is in the proximity of Person B's device, the intruder indicator can be activated. A user can be recognized using one or more of facial recognition, body recognition, gait recognition, voice recognition, or proximity recognition, etc.

In one example, if Person C is not an authorized user on the list of authorized users for Person B's device, and Person C subsequently leaves the proximity of Person B's device, then Person B's device can be configured to deactivate the intruder indicator when each user in the proximity of the local device is recognized as an authorized user. In an example, when Person B and Person C are the only people in the proximity of Person B's device, and Person C, an unauthorized user, leaves the proximity of Person B's device, then the intruder indicator can be deactivated.

In one example, the device (e.g. a local device) can be configured to identify a status of a timer. The status of the timer can indicate that the timer is expired or not expired. When the status of the timer is not expired, the local device can decrement a timer value of the timer. The timer value can be a real number. When the timer value is at a maximum value, wherein the maximum value can be a real number, the local device can store an initial state of the timer.

In one example, the intruder indicator can be a Boolean with a value of true or false. In one example, intruder indicator can have a threshold, wherein the intruder indicator can be activated or deactivated based on the threshold. In one example, when the threshold is exceeded, the intruder indicator can be activated. In another example, when the threshold is not exceeded the intruder indicator can be deactivated (e.g. inactive). In another example, the intruder indicator can have a threshold for activation that is different from the threshold for deactivation. In this example, the threshold can be activated at a value that is greater than the value for deactivation. In this example, the threshold can be deactivated at a value that is less than the value for deactivation. This difference in activation value and deactivation value can be used to prevent changes between activation and deactivation due to small differences in the level of intrusion.

In one example, the intruder indicator can be activated or deactivated based on one or more of audio data, video data, or proximity data. Audio data can include auditory information that can be detected by a microphone or a related sensor. Video data can include visual information that can be detected by a camera or a related sensor. Proximity data can include proximity information that can be detected by a proximity sensor.

In one example, the one or more privacy filters can include deactivating a microphone, deactivating a speaker, deactivating a camera, deactivating a display, deactivating an application window, or deactivating any other sensor used in a device. "Deactivation," "deactivated," and the like as used herein, can refer to a state of inactivity, for example causing a device, or feature of a device, to take or remain in an inactive state, or otherwise removing the effectiveness (e.g. effective operation) thereof.

In one example, deactivating the microphone can include one or more of muting an audio stream of the microphone, reducing a volume of an audio stream of the microphone, or distorting an audio stream of the microphone.

In one example, deactivating the speaker can include one or more of muting an audio output of the speaker, reducing a volume of an audio output of the speaker, or distorting an audio output of the speaker.

In one example, deactivating the camera can include one or more of switching off the camera, reducing a brightness of a video stream from the camera, or distorting a video stream from the camera.

In one example, deactivating the display can include one or more of switching off the display, reducing a brightness of the display, distorting a video output of the display, or switching the display to different content.

In one example, the device (e.g., a local device) can be configured to identify a level of intrusion in the proximity of the local device. The level of intrusion can be based on one or more of audio data, video data, proximity data, or other related data from a sensor. In one example, the local device can activate one or more privacy filters at the local device based on the level of intrusion. In an example, Person B's device can identify a loud sound from outdoors by using microphone, an intruder looking at Person B's display from outside a window by using a camera, and a proximity sensor that can identify the location of the intruder within a proximity of Person B's device. In this example, the level of intrusion can be higher than a level of intrusion in which a distant airplane or vehicle passes and emits a weak sound. In the example of the intruder peering through the window, a greater number of privacy filters can be activated with each activated privacy filter based on a higher level of intrusion. In the example of the distant airplane, a lesser number of privacy filters can be activated with each activated privacy filter based on a lower level of intrusion, (e.g. the volume of the audio stream from the microphone can be lowered).

In one example, the local device can be configured to identify a location of the local device and activate the one or more privacy filters at the local device based on the location of the local device. In an example, Person B's device can be in Person B's office. In this example, a higher level of privacy filters can be activated. In another example, Person B's device can be in a public park or a coffee shop in which a lower level of privacy filters can be activated.

In one example, the local device can be configured to identify privacy settings of the local device and activate the one or more privacy filters at the local device based on the privacy settings of the local device. In an example, the privacy settings of Person B's device can be customized to be more or less sensitive to potential intrusions. Person B can customize the privacy settings so that recurring sounds, e.g. a barking dog, do not activate the one or more privacy filters. Person B can customize the privacy settings so that recurring intrusions, (e.g. an intruder who frequently attempts to eavesdrop on communications involving Person B), do activate the one or more privacy filters.

In one example, the local device can be configured to encode data based on the one or more privacy filters for transmission from the local device to one or more remote devices. In an example, Person B's device can be configured to transmit the data encoded with one or more privacy filters to a Person C and a Person D.

In one example, the local device can be configured to identify a level of ambient audio and a level of background video. The local device can be configured to activate or deactivate the one or more privacy filters at the local device based on the level of ambient audio or the level of background video. In an example, Person B's device can be located near a railroad track. In this example, Person B's device can be configured to modify the threshold for activation of the privacy filters based on the ambient audio from trains passing by. In another example, Person B's device can be located near a window with a large number of people moving past the window without stopping. In this example, Person B's device can be configured to identify the people passing by the window as background video, and can be configured to modify the threshold for activation of the privacy filters based on the level of background video.

In one example, the device (e.g. a local device) can be configured to deactivate a portion of one or more of the microphone, the camera, the speaker, or the display. In an example, a portion of the video stream sent to the remote user can be deactivated, distorted, or blurred. When the local user is in a public place, people walking in the background can be blurred out or portions of the people can be blurred out. In another example, the background of the video stream can be blurred out or distorted.

In one example, the local device can be configured to identify a number of locations of sources of user audio or a number of user voices. The local device can be configured to activate or deactivate the one or more privacy filters at the local device based on the number of locations of sources of user audio or the number of voices. When the number of sources of user audio is greater than the number of authorized users, the privacy filters at the local device can be activated. When the number of sources of user audio is less than or equal to the number of authorized users, the privacy filters at the local device can be deactivated. When the number of user voices is greater than the number of authorized users, the privacy filters the local device can be activated. When the number of user voices is less than or equal to the number of authorized users, the privacy filters at the local device can be deactivated.

In one example, a physical position of a camera of the local device can be moved or the angle of the camera of the local device can be adjusted to detect intrusion in a proximity of the local device. In one example, the camera can move toward or angle toward a source of a sound to detect intrusion. In another example, the camera can move toward or angle toward a proximity source in order to detect intrusion. In another example, the physical position of the camera or the angle of the camera can adjust to detect intrusion based on audio data, video data, proximity data, or any other related sensor data.

In one example, a local device can receive video data, audio data, proximity data, or other sensory data from other devices to detect intrusion at the local device. In an example, the local device can use video data obtained from a camera that is separate from the local device to detect an intrusion at the local device.

In one example, a user can be authenticated by one or more of an audio sample, a video sample, or a proximity sample.

In one example, the local device can be configured to identify an authorized user based on one or more of facial recognition, body recognition, gait recognition, voice recognition, or proximity recognition. In another example, the local device can be configured to identify an intruder based on one or more of facial recognition, body recognition, gait recognition, voice recognition, or proximity recognition.

In another example, the local device can be configured to activate one or more privacy filters at a remote device in communication with the local device.

In another example, the local device can be configured to communicate with a remote device, wherein the remote device is a cloud device.

In another example, a device can be configured to decode data communicated from a local device.

In one example, as depicted in a table in FIG. 2, Person B (the local user) and Person A (the remote user) can each want private communication. Person B can attain privacy by one or more of: (a) deactivation of Person B's camera and displaying a message to the remote user on the remote user's device about the presence of an Intruder, (b) deactivation of Person B's microphone, (c) deactivation of open application windows at Person B's device, (d) deactivation of Person B's display, or (e) deactivation of Person B's speakers. Person A can attain privacy by one or more of: (a) deactivation of application windows on Person B's device that can reveal visual information about Person A, or (b) deactivation of speakers on Person B's device that can reveal auditory information about Person A.

In one example, Person B (the local user) might want private communication while Person A (the remote user) might want public communication. Person B can attain privacy by one or more of: (a) deactivation of Person B's camera and displaying a message to the remote user on the remote user's device about the presence of an Intruder, (b) deactivation of Person B's microphone, (c) deactivation of open application windows at Person B's device, (d) deactivation of Person B's display, or (e) deactivation of Person B's speakers. In this example, Person A, who does not want privacy, would not depend on the actions at Person B's device.

In one example, Person B (the local user) might want public communication while Person A (the remote user) might want private communication. Person A can attain privacy by one or more of: (a) deactivation of application windows on Person B's device that can reveal visual information about Person A, or (b) deactivation of speakers on Person B's device that can reveal auditory information about Person A.

In one example, Person B (the local user) might want public communication and Person A (the remote user) might want public communication. In this example, Person B's device may not use any privacy filters.

Figure 3:
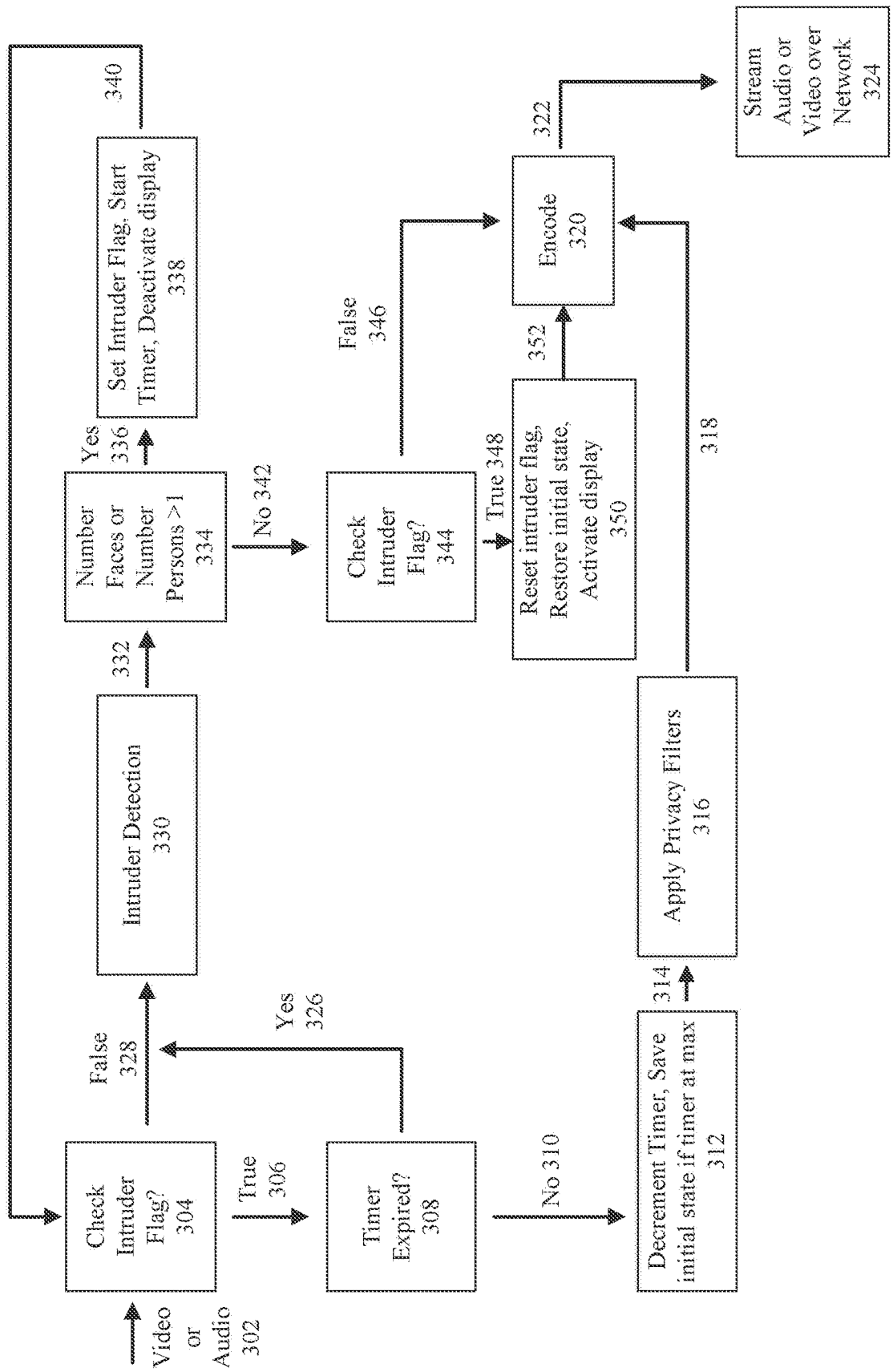
FIG. 3 illustrates a diagram for secured user access in accordance with an example embodiment.

In one example, as depicted in the diagram in FIG. 3, video or audio information can be communicated from a local device to a remote device. In operation 302 new video or audio information from the local device can be identified at the local device. In operation 304, the intruder flag can be checked. If the intruder flag is true (306), then operation 308 can be triggered. In operation 308, if the timer is not expired (310), then the timer can be decremented and the initial state of the timer can be saved if the timer is at a maximum value (312). In operation 316, one or more privacy filters can be applied or activated at the local device. In operation 320, the local device can encode data based on the one or more privacy filters. The local device can communicate the encoded data for transmission from the local device to a remote device in operation 324. The one or more privacy filters applied at the local device can include one or more of: deactivating a microphone at the local device, deactivating a speaker at the local device, deactivating a camera at the local device, deactivating a display at the local device, deactivating an application window at the local device, or a combination thereof.

In one example, if the timer is expired in operation 308 or if the intruder flag is false in operation 304, intruder detection can be identified in operation 330. In operation 334, if the number of faces or number of persons identified by the local device is greater than 1, then the local device can set the intruder flag to true, start the timer, and deactivate the display in operation 338. In operation 334, if the number of faces or number of persons identified by the local device is not greater than 1, then the local device can check the intruder flag in operation 344. In operation 344, if the intruder flag is set to false (346), then the local device can encode data in 320. The local device can communicate the encoded data for transmission from the local device to a remote device in operation 324. In operation 344, if the intruder flag is set to true (346), then the local device can reset the intruder flag, restore the initial state of the timer, and activate the display in operation 350. The local device can encode data in 320. The local device can communicate the encoded data for transmission from the local device to a remote device in operation 324.

In one example, new video or audio information communicated from a local device can be identified at the remote device in operation 302. In one example, the remote device can receive an intruder indicator from the local device, wherein the intruder indicator can indicate that an intruder has been detected in a proximity of the local device. In another example, the remote device might not receive an intruder indicator from the local device. In operation 304, the intruder flag can be checked at the remote device based on the new video or audio information communicated from the local device. If the intruder flag is true (306), then operation 308 can be triggered. In operation 308, if the timer is not expired (310), then the timer can be decremented and the initial state of the timer can be saved if the timer is at a maximum value (312). In operation 316, one or more privacy filters can be applied or activated at the remote device. In operation 320, the remote device can encode data based on the one or more privacy filters. The remote device can communicate the encoded data for transmission from the remote device to the local device in operation 324. The one or more privacy filters applied at the remote device can include one or more of: deactivating a microphone at the remote device, deactivating a camera at the remote device, deactivating an application window at the remote device, terminating communication with the local device, or a combination thereof.

In one example, if the timer is expired in operation 308 or if the intruder flag is false in operation 304, intruder detection can be identified in operation 330 based on the new video or audio information communicated from the local device. In operation 334, if the number of faces or number of persons identified by the remote device is greater than 1, then the remote device can set the intruder flag to true and start the timer in operation 338. In operation 334, if the number of faces or number of persons identified by the remote device is not greater than 1, then the remote device can check the intruder flag in operation 344. In operation 344, if the intruder flag is set to false (346), then the remote device can encode data in 320. The remote device can communicate the encoded data for transmission from the remote device to the local device in operation 324. In operation 344, if the intruder flag is set to true (346), then the remote device can reset the intruder flag and restore the initial state of the timer in operation 350. The remote device can encode data in 320. The remote device can communicate the encoded data for transmission from the remote device to a local device in operation 324.

Figure 4:
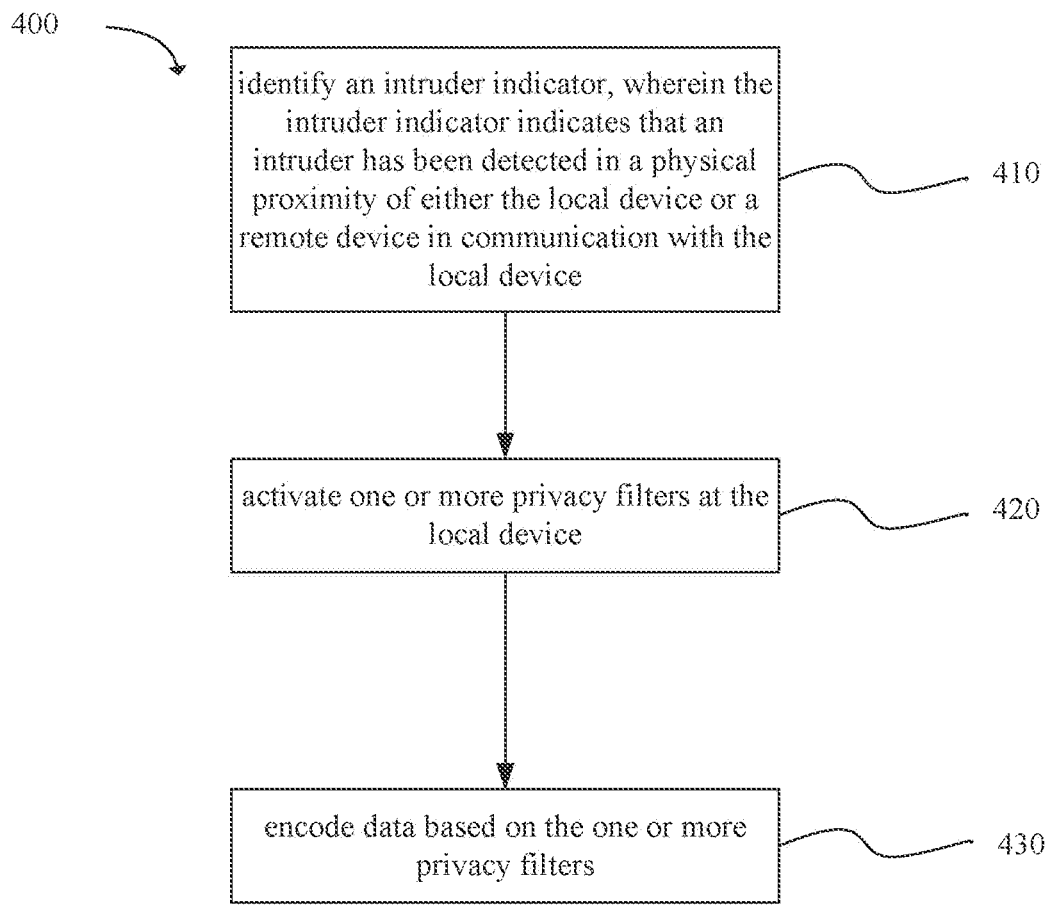
FIG. 4 depicts functionality for secured user access in accordance with an example embodiment.

Another example provides functionality 400 of an apparatus of a local device operable for secured user access, as shown in the flow chart in FIG. 4. The apparatus can comprise one or more processors. The one or more processors can be configured to identify an intruder indicator, wherein the intruder indicator indicates that an intruder has been detected in a physical proximity of either the local device or a remote device in communication with the local device, as in block 410. The one or more processors can be configured to activate one or more privacy filters at the local device, as in block 420. The one or more processors can be configured to encode data based on the one or more privacy filters, as in block 430.

Figure 5:
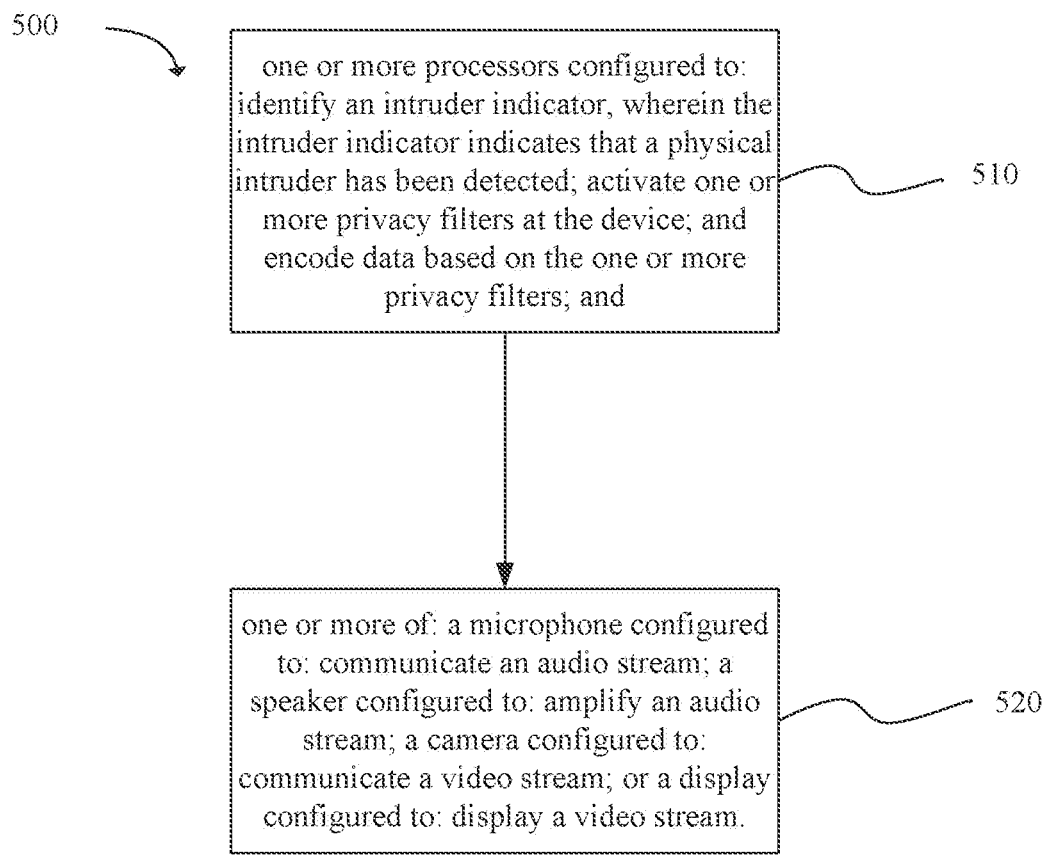
FIG. 5 depicts a device for secured user access in accordance with an example embodiment.

Another example provides functionality 500 of a device operable for secured user access, as shown in the flow chart in FIG. 5. The device can comprise one or more processors. The one or more processors can be configured to: identify an intruder indicator, wherein the intruder indicator indicates that a physical intruder has been detected; activate one or more privacy filters at the device; and encode data based on the one or more privacy filters, as in block 510. The device can comprise one or more of: a microphone configured to: communicate an audio stream; a speaker configured to: amplify an audio stream; a camera configured to: communicate a video stream; or a display configured to: display a video stream, as in block 520.

Figure 6:
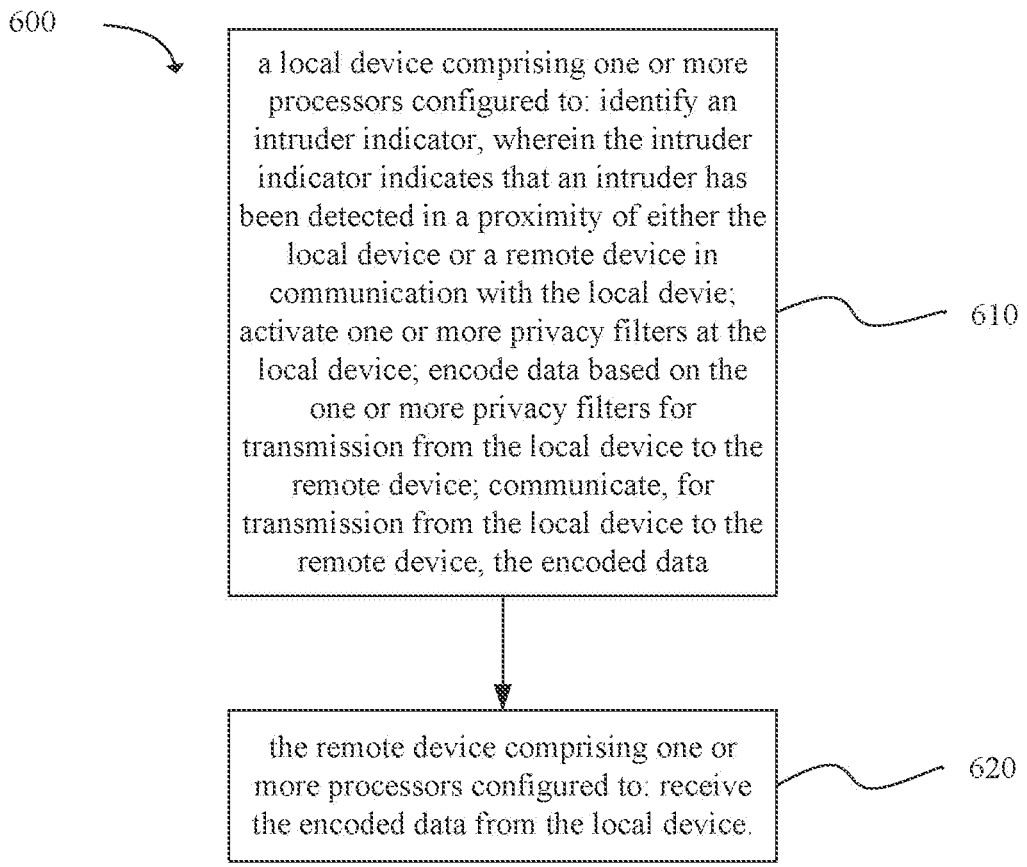
FIG. 6 depicts a system for secured user access in accordance with an example embodiment.

Another example provides functionality 600 of a system operable for secured user access, as shown in the flow chart in FIG. 6. The system can comprise a local device comprising one or more processors configured to: identify an intruder indicator, wherein the intruder indicator indicates that an intruder has been detected in a proximity of either the local device or a remote device in communication with the local device; activate one or more privacy filters at the local device; encode data based on the one or more privacy filters for transmission from the local device to the remote device; communicate, for transmission from the local device to the remote device, the encoded data, as in block 610. The system can comprise the remote device comprising one or more processors configured to: receive the encoded data from the local device, as in block 620.

Figure 7:
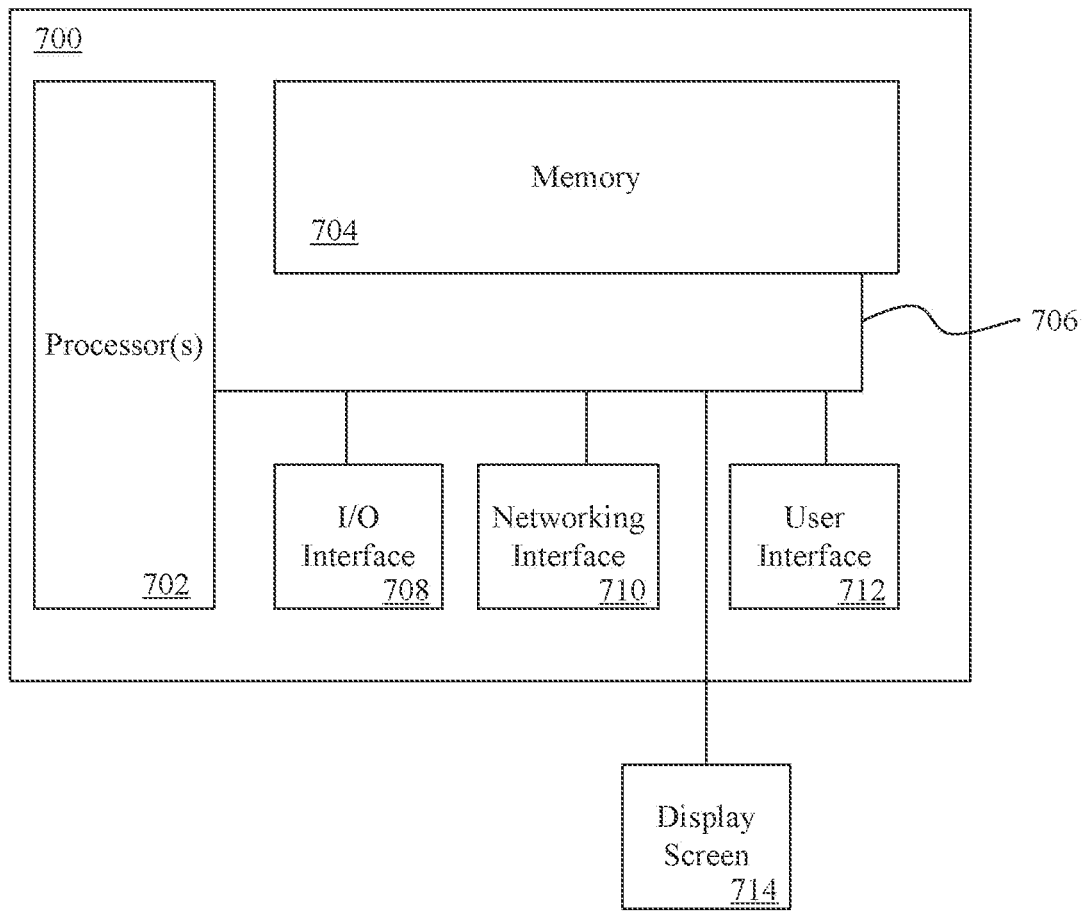
FIG. 7 illustrates a computing system that includes a data storage device in accordance with an example embodiment.

FIG. 7 illustrates a general computing system or device 700 that can be employed in the present technology. The computing system 700 can include a processor 702 in communication with a memory 704. The memory 704 can include any device, combination of devices, circuitry, and the like that is capable of storing, accessing, organizing, and/or retrieving data. Non-limiting examples include SANs (Storage Area Network), cloud storage networks, volatile or non-volatile RAM, phase change memory, optical media, hard-drive type media, and the like, including combinations thereof.

The computing system or device 700 additionally includes a local communication interface 706 for connectivity between the various components of the system. For example, the local communication interface 706 can be a local data bus and/or any related address or control busses as may be desired.

The computing system or device 700 can also include an I/O (input/output) interface 708 for controlling the I/O functions of the system, as well as for I/O connectivity to devices outside of the computing system 700. A network interface 710 can also be included for network connectivity. The network interface 710 can control network communications both within the system and outside of the system. The network interface can include a wired interface, a wireless interface, a Bluetooth interface, optical interface, and the like, including appropriate combinations thereof. Furthermore, the computing system 700 can additionally include a user interface 712, a display device 714, as well as various other components that would be beneficial for such a system.

The processor 702 can be a single or multiple processors, and the memory 704 can be a single or multiple memories. The local communication interface 706 can be used as a pathway to facilitate communication between any of a single processor, multiple processors, a single memory, multiple memories, the various interfaces, and the like, in any useful combination.

Figure 8:
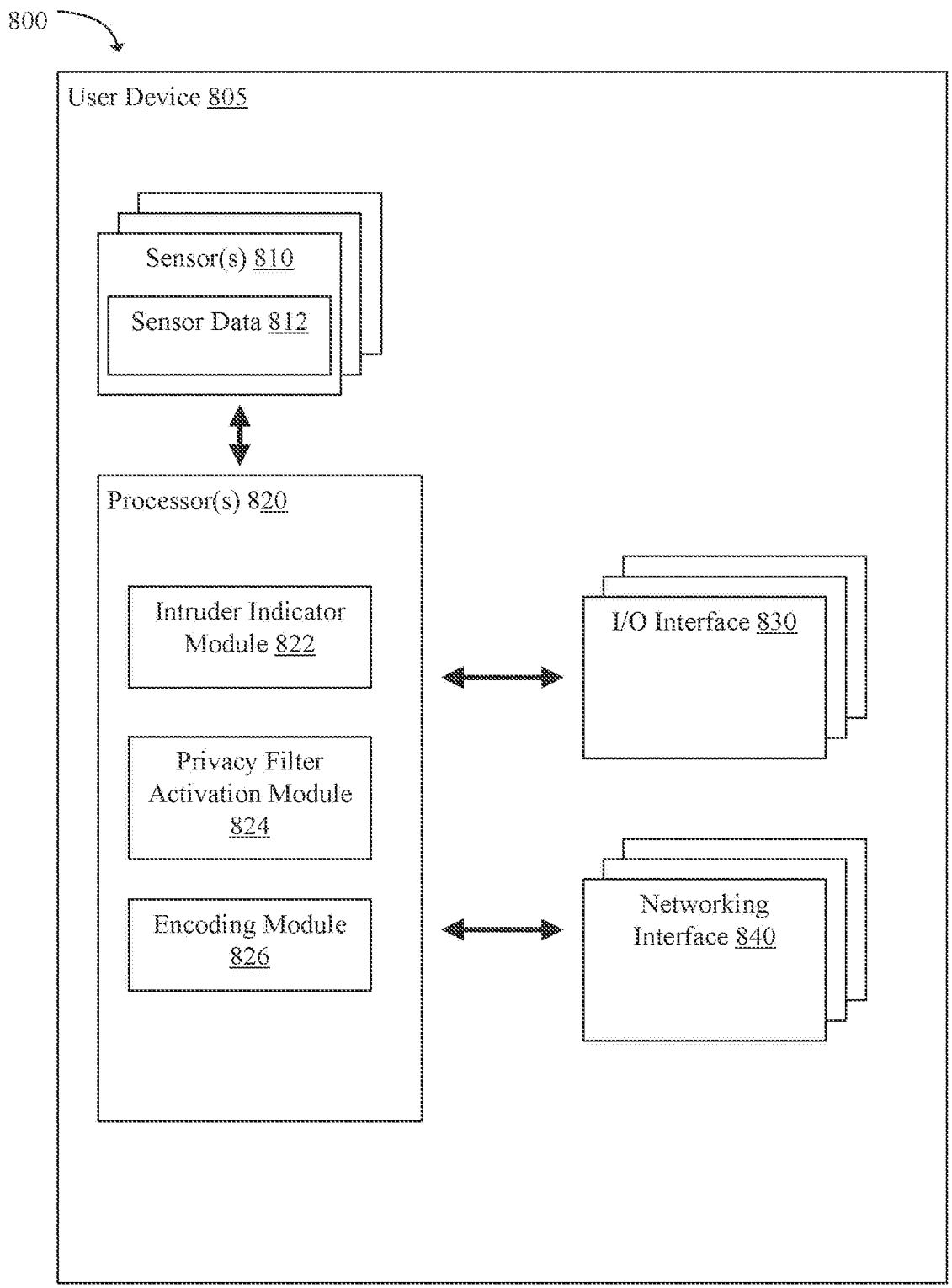
FIG. 8 illustrates a user device operable for secured user access in accordance with an example embodiment.

FIG. 8 illustrates an example 800 of a user device 805 operable for secured user access. In one example, the user device 805 can include one or more processor(s) 820, a plurality of sensor(s) 810, an input/output (I/O) interface 830, and a networking interface 840. The one or more processor(s) 820 and the plurality of sensor(s) 810 can communicate with each other using a local network. In one example, the local network can be a wireless local area network (WLAN). The processor(s) 820 may include one or more processors and memory configured to process sensor data 812 received from the plurality of sensors. The sensors 810 can include, but are not limited to, sound detectors, video cameras, temperature sensors, photo sensors, motion detectors, vibration sensors, etc. The sensor data 812 can include, but is not limited to, audio/video data, temperature data, photo sensor data, motion data, vibration data, etc.

As in this written description, the terms "local device", "remote device", and "user device" can be used interchangeably to indicate a device operable for secured user access.

In one example, the sensors 810 can capture the sensor data 812 in a proximity of the user device. The sensors 810 can send the sensor data 812 to the processor(s) 820. The processor(s) 820 can receive the sensor data 812 from the sensors 810. For example, the sensors 810 and the processor(s) 820 can include a transceiver that enables the sending/receiving of the sensor data 812.

In one example, the processor(s) 820 can include an intruder indicator module 822 configured to identify an intruder indicator, wherein the intruder indicator indicates that an intruder has been detected in a proximity of the user device. In one example, the intruder indicator module 822 can be configured to identify when an intruder is in the proximity of the user device based on the sensor data 812 received from the sensors 810. The processor(s) 820 can continually receive and process the sensor data 812 in order to detect intrusion. For example, the intruder indicator module 822 can monitor noise levels in the proximity of the user device based on the sensor data 812 (e.g., audio data), and the intruder indicator module 822 can detect intrusion when the noise levels in the proximity of the user device reach a certain threshold. In another example, the intruder indicator module 822 can monitor noise levels in the proximity of the user device based on the sensor data 812, and the intruder indicator module 822 can detect an intrusion when a spike in noise level occurs in the proximity of the user device.

In one example, the intruder indicator module 822 can visually monitor user actions that occur in the proximity of the user device based on the sensor data 812 (e.g., video data), and the intruder indicator module 822 can detect an intrusion when certain user actions occur in the proximity of the user device. In another example, the intruder indicator module 822 can monitor a brightness level in the proximity of the user device based on the sensor data 812 (e.g., photo sensor data), and the intruder indicator module 822 can detect an intrusion when the brightness level reaches a defined threshold. In another example, the intruder indicator module 822 can monitor an odor level in the proximity of the user device based on the sensor data 812 (e.g., odor data), and the intruder indicator module 822 can detect an intrusion when the odor level reaches a defined threshold. In yet another example, the intruder indicator module 822 can monitor a temperature level in the proximity of the user device based on the sensor data 812 (e.g., temperature data), and the intruder indicator module 822 can detect an intrusion when the temperature level reaches a defined threshold. In another example, the intruder indicator module 822 can monitor a vibration level in the proximity of the user device based on the sensor data 812 (e.g., vibration data), and the intruder indicator module 822 can detect an intrusion when the vibration level reaches a defined threshold (e.g., due to a person's vibrating chair or physical activity such as jumping).

In one configuration, the processor(s) 820 may include an intruder indicator module 822 that determines, using a model, whether the intrusion events that occurs in the proximity of the user device exceed a threshold. For example, certain intrusion events that occur can be classified as not exceeding a threshold when the intrusion event is transitory, unavoidable, expected for a certain user given the user's unique circumstances, etc. For example, certain noises such as coughs, sneezes, sudden noises when an item is dropped, etc. can generally be considered as brief and unavoidable, and therefore, the intruder indicator module 822 can determine, using the model, that these intrusion events are below the threshold. Alternatively, certain intrusion events that occur in the proximity of the user device can be classified as exceeding the threshold when the intrusion event is prolonged, avoidable, and generally intrusive.

In one example, the model used by the intruder indicator module 822 to classify the intrusion event can include, but is not limited to, a machine learning model, an artificial intelligence (AI) model, a neural network, a support vector machine, a Bayesian network, a genetic algorithm, etc. The model can use predictive analytics, supervised learning, semi-supervised learning, unsupervised learning, reinforcement learning, etc.

In one configuration, the model can be generated and trained using training data. The training data can include data on intrusion events that exceed a threshold and data on intrusion events that are below the threshold. The model can be trained to distinguish between intrusion events that are above the threshold versus intrusion events that are below the threshold. In addition, the model can continue to receive additional training data over time, in order to recognize new types of below/above threshold intrusion events that can potentially occur in the proximity of the user device. Therefore, the model can continually mature and improve over time, and enable the intruder indicator module 822 to accurately classify intrusion events as being below or above the threshold.

In one example, the processor(s) 820 may receive the sensor data 812 from the sensors 810, and the processor(s) 820 can delete the sensor data 812 after a defined period of time. Thus, the sensor data 812 can be stored on the processor(s) 820 for a limited duration of time. In one example, the processor(s) 820 can receive the sensor data 812 and process the sensor data 812 to determine whether an intrusion event has occurred. When the sensor data 812 does not indicate an occurrence of an intrusion, that sensor data 812 can be deleted from the processor(s) 820.

In one example, the processor(s) 820 can include a privacy filter activation module 824 configured to activate one or more privacy filters at the user device. In one example, the privacy filter activation module 822 can be configured to activate one or more privacy filters at the user device based on the sensor data 812 received from the sensors 810. The processor(s) 820 can continually receive and process the sensor data 812 in order to detect intrusion. The one or more privacy filters can include one or more of deactivating a microphone, deactivating a speaker, deactivating a camera, deactivating a display, deactivating a display window, or deactivating another sensor, wherein the sensor can include one or more of temperature sensors, photo sensors, motion detectors, vibration sensors, proximity sensors, and the like.

In one example, the processor(s) 820 can include an encoding module 826 configured to encode data based on the one or more privacy filters. In one example, the encoding module 826 can be configured to encode data based on the one or more privacy filters at the user device 805 based on the sensor data 812 received from the sensors 810. The processor(s) 820 can continually receive and process the sensor data 812 in order to detect intrusion. The encoded data can include one or more of, but is not limited to, audio data, video data, temperature data, photo sensor data, motion data, vibration data, proximity data, and the like.

The user device 805 can also include an I/O (input/output) interface 830 for controlling the I/O functions of the system, as well as for I/O connectivity to devices outside of the user device 800. A network interface 840 can also be included for network connectivity. The network interface 840 can control network communications both within the system and outside of the system. The network interface can include a wired interface, a wireless interface, a Bluetooth interface, optical interface, and the like, including appropriate combinations thereof.

The user device 805 can also additionally include one or more microphones, one or more speakers, one or more cameras, one or more displays, or one or more additional sensors that would be beneficial for such a device.

Figure 9:
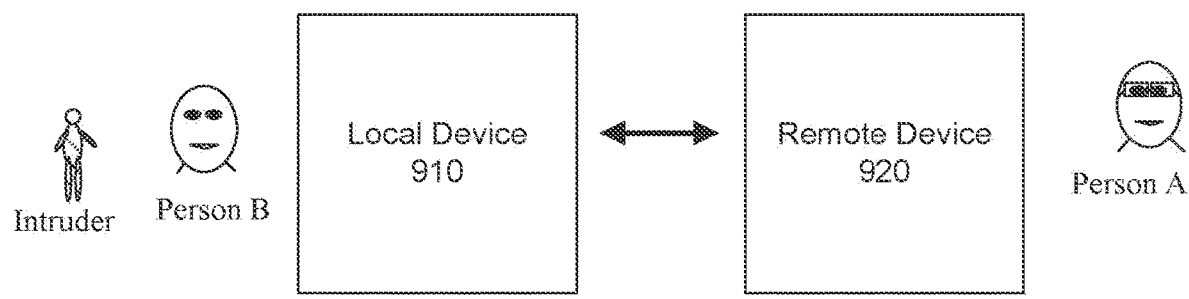
FIG. 9 illustrates a local device operable for secured user access in communication with a remote device operable for secured user access in accordance with an example embodiment.

In one example, as illustrated in FIG. 9, a local device 910 can be configured to communicate with a remote device 920. Person B can be located in a proximity of the local device. An Intruder can also be located in the proximity of the local device. Person A can be located in a proximity of a remote device. In one example, the local device 910 can be configured to identify an intruder indicator, wherein the intruder indicator indicates that an intruder has been detected in a proximity of the local device 910; activate one or more privacy filters at the local device 910; and encode data based on the one or more privacy filters. The encoded data can be communicated from the local device 910 to the remote device 920.

In one example, the remote device 920 can be configured to identify an intruder indicator, wherein the intruder indicator indicates that an intruder has been detected in a proximity of the local device 910; activate one or more privacy filters at the remote device 920; and encode data at the remote device based on the one or more privacy filters. The encoded data can be communicated from the remote device 920 to the local device 910.

Various techniques, or certain aspects or portions thereof, can take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a RAM, EPROM, flash drive, optical drive, magnetic hard drive, solid state drive, or other medium for storing electronic data. The node and wireless device can also include a transceiver module, a counter module, a processing module, and/or a clock module or timer module. One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations. Exemplary systems or devices can include without limitation, laptop computers, tablet computers, desktop computers, smart phones, computer terminals and servers, storage databases, and other electronics which utilize circuitry and programmable memory, such as household appliances, smart televisions, digital video disc (DVD) players, heating, ventilating, and air conditioning (HVAC) controllers, light switches, and the like.

EXAMPLES

The following examples pertain to specific technology embodiments and point out specific features, elements, or steps that can be used or otherwise combined in achieving such embodiments.

In one example, there is an apparatus of a local device operable for secured user access. The apparatus can comprise one or more processors. The one or more processors can be configured to identify an intruder indicator, wherein the intruder indicator indicates that an intruder has been detected in a physical proximity of either the local device or a remote device in communication with the local device. The one or more processors can be configured to activate one or more privacy filters at the local device. The one or more processors can be configured to encode data based on the one or more privacy filters.

In one example of the one or more processors, the one or more processors can be configured to: identify a number of authorized users at the proximity of either the local device or the remote device; identify a number of users at the proximity of either the local device or the remote device; and activate the intruder indicator when the number of users at the proximity of either the local device or the remote device is greater than the number of authorized users at the proximity of either the local device or the remote device.

In one example of the one or more processors, the one or more processors can be configured to: identify a number of authorized users at the proximity of either the local device or the remote device; identify a number of users at the proximity of either the local device or the remote device; and deactivate the intruder indicator when the number of users at the proximity of either the local device or the remote device is less than or equal to the number of authorized users at the proximity of either the local device or the remote device.

In one example of the one or more processors, the one or more processors can be configured to: modify a list of authorized users by adding a user to the list of authorized users or deleting a user from the list of authorized users.

In one example of the one or more processors, the one or more processors can be configured to: activate the intruder indicator when a user in the proximity of either the local device or the remote device is recognized who is not an authorized user.

In one example of the one or more processors, the one or more processors can be configured to: deactivate the intruder indicator when each user recognized in the proximity of either the local device or the remote device is recognized as an authorized user.

In one example of the one or more processors, the one or more processors can be configured to: identify a status of a timer; and decrement a timer value of the timer when the status of the timer is not expired; or store an initial state of the timer when the timer value is at a maximum value.

In one example of the one or more processors, the one or more processors can be configured to: identify a threshold to activate the intruder indicator; and activate or deactivate the intruder indicator based on the threshold.

In one example of the one or more processors, the one or more processors can be configured to: activate or deactivate the intruder indicator based on one or more of audio data, video data, or proximity data.

In one example of the one or more processors, wherein the one or more privacy filters can include deactivating a microphone, deactivating a speaker, deactivating a camera, deactivating a display, or deactivating an application window.

In one example of the one or more privacy filters, wherein deactivating the microphone can include one or more of: muting an audio stream of the microphone; reducing a volume of an audio stream of the microphone; or distorting an audio stream of the microphone.

In one example of the one or more privacy filters, wherein deactivating the speaker can include one or more of: muting an audio output of the speaker; reducing a volume of an audio output of the speaker; or distorting an audio output of the speaker.

In one example of the one or more privacy filters, wherein deactivating the camera can include one or more of: switching off the camera; reducing a brightness of a video stream from the camera; or distorting a video stream from the camera.

In one example of the one or more privacy filters, wherein deactivating the display includes one or more of: switching off the display; reducing a brightness of the display; or distorting a video output of the display.

In one example of the one or more processors, the one or more processors can be configured to: identify a level of intrusion in the proximity of either the local device or the remote device; and activate the one or more privacy filters at the local device based on the level of intrusion.

In one example of the one or more processors, the one or more processors can be configured to: identify a location of the local device; and activate the one or more privacy filters at the local device based on the location of the local device.

In one example of the one or more processors, the one or more processors can be configured to: identify privacy settings of the local device; and activate the one or more privacy filters at the local device based on the privacy settings of the local device.

In one example of the one or more processors, the one or more processors can be configured to: encode data based on the one or more privacy filters for transmission from the local device to an additional remote device.

In one example of the one or more processors, the one or more processors can be configured to: identify a level of ambient audio; identify a level of background video; and activate or deactivate the one or more privacy filters at the local device based on the level of ambient audio or the level of background video.

In one example of the one or more processors, the one or more processors can be configured to: identify a number of locations of sources of user audio; identify a number of user voices; and activate or deactivate the one or more privacy filters at the local device based on the number of locations of sources of user audio or the number of user voices.

In one example of the one or more processors, the one or more processors can be configured to: adjust a physical position of a camera or adjust an angle of a camera to detect intrusion at the local device.

In one example of the one or more processors, the one or more processors can be configured to: receive video data, audio data, or proximity data from other devices to detect intrusion at the local device.

In one example of the one or more processors, the one or more processors can be configured to: authenticate a user based on an audio sample, a video sample, or a proximity sample.

In one example of the one or more processors, the one or more processors can be configured to: identify an authorized user based on one or more of: facial recognition, body recognition, gait recognition, voice recognition, or proximity recognition; or identify an intruder based on one or more of facial recognition, body recognition, gait recognition, voice recognition, or proximity recognition.

In one example of the one or more processors, the one or more processors can be configured to: communicate the encoded data for transmission from the local device to the remote device.

In one example of the one or more processors, the one or more processors can be configured to: activate one or more privacy filters at the remote device.

In one example of the one or more processors, the one or more processors can be configured to: send an intruder indicator, wherein the intruder indicator indicates that an intruder has been detected in a proximity of the local device.

In one example, there is a device operable for secured user access. The device can comprise one or more processors. The one or more processors can be configured to: identify an intruder indicator, wherein the intruder indicator indicates that a physical intruder has been detected; activate one or more privacy filters at the device; and encode data based on the one or more privacy filters. The device can comprise one or more of: a microphone configured to: communicate an audio stream; a speaker configured to: amplify an audio stream; a camera configured to: communicate a video stream; or a display configured to: display a video stream.

In one example of the one or more processors, the one or more processors can be configured to: deactivate the microphone by one or more of: muting an audio stream of the microphone; reducing a volume of an audio stream of the microphone; or distorting an audio stream of the microphone.

In one example of the one or more processors, the one or more processors can be configured to: deactivate the speaker by one or more of: muting an audio output of the speaker; reducing a volume of an audio output of the speaker; or distorting an audio output of the speaker.

In one example of the one or more processors, the one or more processors can be configured to: deactivate the camera by one or more of: switching off the camera; reducing a brightness of a video stream from the camera; or distorting a video stream from the camera.

In one example of the one or more processors, the one or more processors can be configured to: deactivate the display by one or more of: switching off the display; reducing a brightness of the display; or distorting a video output of the display.

In one example of the device, wherein the device can be a local device.

In one example of the local device, the one or more processors can be configured to: communicate the encoded data for transmission from the local device to a remote device.

In one example of the remote device, the one or more processors can be configured to: activate one or more privacy filters at the remote device.

In one example of the device, wherein the intruder indicator can indicate that a physical intruder has been detected in a proximity of the device.

In one example of the device, wherein the device can be a remote device.

In one example of the remote device, the one or more processors can be configured to: receive the intruder indicator from a local device, wherein the intruder indicator indicates that an intruder has been detected in a proximity of the local device.

In one example of the remote device, the one or more processors can be configured to: decode data communicated from a local device.

In one example, there is provided a system operable for secured user access. The system can comprise a local device comprising one or more processors. The one or more processors can be configured to: identify an intruder indicator, wherein the intruder indicator indicates that an intruder has been detected in a proximity of either the local device or a remote device in communication with the local device; activate one or more privacy filters at the local device; encode data based on the one or more privacy filters for transmission from the local device to the remote device; and communicate, for transmission from the local device to the remote device, the encoded data. The remote device can comprise one or more processors configured to receive the encoded data from the local device.

In one example of the system, the local device can comprise one or more of a microphone, a speaker, a camera, or a display.

In one example of the system, the remote device can comprise one or more of a microphone, a speaker, a camera, or a display.

In one example of the system, the remote device can be a cloud device.

In one example, there is provided a method for facilitating secured user access. The method can comprise: identifying an intruder indicator, wherein the intruder indicator indicates that an intruder has been detected in a physical proximity of either the local device or a remote device in communication with the local device; activating one or more privacy filters at the local device; and encoding data based on the one or more privacy filters.

In one example of the method for facilitating secured user access, the method can comprise: identifying a number of authorized users at the proximity of either the local device or the remote device; identifying a number of users at the proximity of either the local device or the remote device; and activating the intruder indicator when the number of users at the proximity of either the local device or the remote device is greater than the number of authorized users at the proximity of either the local device or the remote device.

In one example of the method for facilitating secured user access, the method can comprise: identifying a number of authorized users at the proximity of either the local device or the remote device; identifying a number of users at the proximity of either the local device or the remote device; and deactivating the intruder indicator when the number of users at the proximity of either the local device or the remote device is less than or equal to the number of authorized users at the proximity of either the local device or the remote device.

In one example of the method for facilitating secured user access, the method can comprise: modifying a list of authorized users by adding a user to the list of authorized users or deleting a user from the list of authorized users.

In one example of the method for facilitating secured user access, the method can comprise: activating the intruder indicator when a user in the proximity of either the local device of the remote device is recognized who is not an authorized user.

In one example of the method for facilitating secured user access, the method can comprise: deactivating the intruder indicator when each user recognized in the proximity of either the local device or the remote device is recognized as an authorized user.

In one example of the method for facilitating secured user access, the method can comprise: identifying a status of a timer; and decrementing a timer value of the timer when the status of the timer is not expired; or storing an initial state of the timer when the timer value is at a maximum value.

In one example of the method for facilitating secured user access, the method can comprise: identifying a threshold to activate the intruder indicator; and activating or deactivate the intruder indicator based on the threshold.

In one example of the method for facilitating secured user access, the method can comprise: activating or deactivating the intruder indicator based on one or more of audio data, video data, or proximity data.

In one example of the method for facilitating secured user access, the method can comprise: communicating the encoded data for transmission from the local device to a remote device.

In one example of the method for facilitating secured user access, the method can comprise: receiving the encoded data at a remote device from the local device.

In one example of the method for facilitating secured user access, wherein the one or more privacy filters can include deactivating a microphone, deactivating a speaker, deactivating a camera, deactivating a display, or deactivating an application window.

In one example of the method for facilitating secured user access, wherein deactivating the microphone can include one or more of: muting an audio stream of the microphone; reducing a volume of an audio stream of the microphone; or distorting an audio stream of the microphone.

In one example of the method for facilitating secured user access, wherein deactivating the speaker can include one or more of: muting an audio output of the speaker; reducing a volume of an audio output of the speaker; or distorting an audio output of the speaker.

In one example of the method for facilitating secured user access, wherein deactivating the camera can include one or more of: switching off the camera; reducing a brightness of a video stream from the camera; or distorting a video stream from the camera.

In one example of the method for facilitating secured user access, wherein deactivating the display can include one or more of: switching off the display; reducing a brightness of the display; or distorting a video output of the display.

In one example, there is provided at least one machine readable storage medium having instructions embodied thereon for secured user access. The instructions when executed by one or more processors at a local device perform the following: identifying an intruder indicator, wherein the intruder indicator indicates that a physical intruder has been detected in a proximity of either the local device or the remote device; activating one or more privacy filters at the local device; and encoding data based on the one or more privacy filters.

In one example of the at least one machine readable storage medium, the machine readable storage medium further comprises instructions that when executed perform the following: identifying a number of authorized users at the proximity of either the local device or the remote device; identifying a number of users at the proximity of either the local device or the remote device; and activating the intruder indicator when the number of users at the proximity of either the local device or the remote device is greater than the number of authorized users at the proximity of either the local device or the remote device.

In one example of the at least one machine readable storage medium, the machine readable storage medium further comprises instructions that when executed perform the following: identifying a number of authorized users at the proximity of either the local device or the remote device; identifying a number of users at the proximity of either the local device or the remote device; and deactivating the intruder indicator when the number of users at the proximity of either the local device or the remote device is less than or equal to the number of authorized users at the proximity of either the local device or the remote device.

In one example of the at least one machine readable storage medium, the machine readable storage medium further comprises instructions that when executed perform the following: modifying a list of authorized users by adding a user to the list of authorized users or deleting a user from the list of authorized users.

In one example of the at least one machine readable storage medium, the machine readable storage medium further comprises instructions that when executed perform the following: activating the intruder indicator when a user in the proximity of either the local device or the remote device is recognized who is not an authorized user.

In one example of the at least one machine readable storage medium, the machine readable storage medium further comprises instructions that when executed perform the following: deactivating the intruder indicator when each user recognized in the proximity of either the local device or the remote device is recognized as an authorized user.

In one example of the at least one machine readable storage medium, the machine readable storage medium further comprises instructions that when executed perform the following: identifying a status of a timer; and decrementing a timer value of the timer when the status of the timer is not expired; or storing an initial state of the timer when the timer value is at a maximum value.

In one example of the at least one machine readable storage medium, the machine readable storage medium further comprises instructions that when executed perform the following: identifying a threshold to activate the intruder indicator; and activating or deactivate the intruder indicator based on the threshold.

In one example of the at least one machine readable storage medium, the machine readable storage medium further comprises instructions that when executed perform the following: activating or deactivating the intruder indicator based on one or more of audio data, video data, or proximity data.

In one example of the at least one machine readable storage medium, the machine readable storage medium further comprises instructions that when executed perform the following: identifying a level of intrusion in the proximity of either the local device or the remote device; and activating the one or more privacy filters at the local device based on the level of intrusion.

In one example of the at least one machine readable storage medium, the machine readable storage medium further comprises instructions that when executed perform the following: identifying a location of the local device; and activating the one or more privacy filters at the local device based on the location of the local device.

In one example of the at least one machine readable storage medium, the machine readable storage medium further comprises instructions that when executed perform the following: identifying privacy settings of the local device; and activating the one or more privacy filters at the local device based on the privacy settings of the local device.

In one example of the at least one machine readable storage medium, the machine readable storage medium further comprises instructions that when executed perform the following: encoding data based on the one or more privacy filters for transmission from the local device to an additional remote device.

In one example of the at least one machine readable storage medium, the machine readable storage medium further comprises instructions that when executed perform the following: identifying a level of ambient audio; identifying a level of background video; and activating or deactivate the one or more privacy filters at the local device based on the level of ambient audio or the level of background video.

In one example of the at least one machine readable storage medium, the machine readable storage medium further comprises instructions that when executed perform the following: identifying a number of locations of sources of user audio; identifying a number of user voices; and activating or deactivate the one or more privacy filters at the local device based on the number of locations of sources of user audio or the number of user voices.

In one example of the at least one machine readable storage medium, the machine readable storage medium further comprises instructions that when executed perform the following: adjusting a physical position of a camera or adjust an angle of a camera to detect intrusion at the local device.

In one example of the at least one machine readable storage medium, the machine readable storage medium further comprises instructions that when executed perform the following: receiving video data, audio data, or proximity data from other devices to detect intrusion at the local device.

In one example of the at least one machine readable storage medium, the machine readable storage medium further comprises instructions that when executed perform the following: authenticating a user based on an audio sample, a video sample, or a proximity sample.

In one example of the at least one machine readable storage medium, the machine readable storage medium further comprises instructions that when executed perform the following: identifying an authorized user based on one or more of facial recognition, body recognition, gait recognition, voice recognition, or proximity recognition; or identifying an intruder based on one or more of facial recognition, body recognition, gait recognition, voice recognition, or proximity recognition.

In one example of the at least one machine readable storage medium, the machine readable storage medium further comprises instructions that when executed perform the following: communicating the encoded data for transmission from the local device to a remote device.

In one example of the at least one machine readable storage medium, the machine readable storage medium further comprises instructions that when executed perform the following: activating one or more privacy filters at the remote device.

While the forgoing examples are illustrative of the principles of technology embodiments in one or more particular applications, it will be apparent to those of ordinary skill in the art that numerous modifications in form, usage and details of implementation can be made without the exercise of inventive faculty, and without departing from the principles and concepts of the disclosure.

What is claimed is:

1. A first apparatus comprising:
   interface circuitry to communicate with a videoconferencing application at a second apparatus via a network;
   instructions; and
   programmable circuitry to be programmed by the instructions to:
      based on video information from the second apparatus, detect a person in physical proximity of the second apparatus; and
      cause control of the second apparatus to activate one or more privacy filters at the second apparatus, the one or more privacy filters to blur information presented at the second apparatus via the videoconferencing application.

2. The first apparatus of claim 1, wherein the programmable circuitry is to cause the interface circuitry to send the information to the videoconferencing application at the second apparatus, the information to be displayed via the videoconferencing application.

3. The first apparatus of claim 2, wherein the one or more privacy filters are one or more first privacy filters, the information to be encoded by the first apparatus based on one or more second privacy filters before being sent by the interface circuitry.

4. The first apparatus of claim 1, wherein the person is an intruder.

5. The first apparatus of claim 1, wherein the programmable circuitry is to detect the person in physical proximity of the second apparatus based on determining that a number of persons in physical proximity of the second apparatus exceeds a number of authorized users.

6. The first apparatus of claim 1, wherein the programmable circuitry is to detect the person in physical proximity of the second apparatus based on audio information corresponding to the video information.

7. A non-transitory computer readable storage medium comprising instructions to program programmable circuitry at a first computer to at least:
   detect a person in physical proximity of a second computer based on video information from the second computer, the second computer to communicate with the first computer via a network; and
   cause control of the second computer to activate one or more privacy filters at the second computer, the one or more privacy filters to blur information via a videoconferencing application.

8. The non-transitory computer readable storage medium of claim 7, wherein the instructions are to program the programmable circuitry to cause transmission of the information to the second computer for display via the videoconferencing application.

9. The non-transitory computer readable storage medium of claim 8, wherein the one or more privacy filters are one or more first privacy filters, the instructions to program the programmable circuitry to encode the information based on one or more second privacy filters.

10. The non-transitory computer readable storage medium of claim 7, wherein the person is an intruder.

11. The non-transitory computer readable storage medium of claim 7, wherein the instructions are to program the programmable circuitry to detect the person in physical proximity of the second computer based on determining that a number of persons in physical proximity of the second computer exceeds a number of authorized users.

12. The non-transitory computer readable storage medium of claim 7, wherein the instructions are to program the programmable circuitry to detect the person in physical proximity of the second computer based on audio corresponding to the video information.

13. A first client device comprising:
   a network interface to obtain video information from a second videoconferencing application at a second client device, the video information to be displayed via a first videoconferencing application at the first client device; and
   programmable circuitry to:
      based on the video information, detect a person in physical proximity of the second client device; and
      cause control of the second client device to activate one or more privacy filters at the second client device, the one or more privacy filters to distort information presented via the second videoconferencing application at the second client device.

14. The first client device of claim 13, wherein the programmable circuitry is to encode the information based on one or more second privacy filters to blur the information after detection of a second person in physical proximity of the first client device.

15. The first client device of claim 13, wherein the programmable circuitry is to cause the second client device to distort the information by blurring the information using the one or more privacy filters.

16. The first client device of claim 13, wherein the programmable circuitry is to detect the person in physical proximity of the second client device based on determining that a number of persons in physical proximity of the second client device exceeds a number of authorized users.

17. The first client device of claim 13, wherein the programmable circuitry is to detect the person by accessing an intruder indicator, the intruder indicator to indicate that an intruder has been detected.

18. The first client device of claim 13, wherein the programmable circuitry is to detect the person in physical proximity of the second client device based on audio information corresponding to the video information.

19. A non-transitory computer readable storage medium comprising instructions to program programmable circuitry at a first client device to at least:
obtain video information from a second videoconferencing application at a second client device to display via a first videoconferencing application at the first client device;
based on the video information, detect a person in physical proximity of the second client device; and
cause control of the second client device to activate one or more privacy filters at the second client device, the one or more privacy filters to distort information via the second videoconferencing application at the second client device.

20. The non-transitory computer readable storage medium of claim 19, wherein the instructions are to program the programmable circuitry to, after detection of a second person in physical proximity of the first client device, encode the information based on one or more second privacy filters, the one or more second privacy filters to blur the information for presentation via the first videoconferencing application.

21. The non-transitory computer readable storage medium of claim 19, wherein the instructions are to program the programmable circuitry to cause the second client device to distort the information by blurring the information using the one or more privacy filters.

22. The non-transitory computer readable storage medium of claim 19, wherein the instructions are to program the programmable circuitry to detect the person in physical proximity of the second client device based on determining that a number of persons in physical proximity of the second client device exceeds a number of authorized users.

23. The non-transitory computer readable storage medium of claim 19, wherein the instructions are to program the programmable circuitry to detect the person by accessing an intruder indicator, the intruder indicator to indicate that an intruder has been detected.

24. The non-transitory computer readable storage medium of claim 19, wherein the instructions are to program the programmable circuitry to detect the person in physical proximity of the second client device based on audio corresponding to the video information.

* * * * *